(12) United States Patent
Oesch et al.

(10) Patent No.: US 7,092,433 B2
(45) Date of Patent: Aug. 15, 2006

(54) RADIOFREQUENCY SIGNAL RECEIVER WITH MEANS FOR IMPROVING THE RECEPTION DYNAMIC OF SAID SIGNALS

(75) Inventors: Yves Oesch, Neuchâtel (CH); Anne Monthéard, Eclépens (CH); Pierre-André Farine, Neuchâtel (CH)

(73) Assignee: Asulab SA, Marin (CH)

( * ) Notice: Subject to any disclaimer, the term of this patent is extended or adjusted under 35 U.S.C. 154(b) by 905 days.

(21) Appl. No.: 10/137,027

(22) Filed: Apr. 30, 2002

(65) Prior Publication Data

US 2002/0167995 A1 Nov. 14, 2002

(30) Foreign Application Priority Data

May 4, 2001 (CH) .................................... 0809/01

(51) Int. Cl.
  *H04B 1/69* (2006.01)
  *G01S 1/00* (2006.01)
(52) U.S. Cl. .................. 375/148; 375/150; 342/357.1
(58) Field of Classification Search ........ 375/147–148, 375/150, 249–250, 305, 336; 370/320; 701/213
See application file for complete search history.

(56) References Cited

U.S. PATENT DOCUMENTS

| | | | | |
|---|---|---|---|---|
| 5,486,834 A | * | 1/1996 | Lennen | 342/357.12 |
| 5,537,121 A | * | 7/1996 | Lennen | 342/357.12 |
| 5,600,670 A | * | 2/1997 | Turney | 375/150 |
| 5,724,046 A | * | 3/1998 | Martin et al. | 342/357.12 |
| 5,963,582 A | * | 10/1999 | Stansell, Jr. | 375/148 |
| 6,028,887 A | | 2/2000 | Harrison et al. | |
| 6,628,699 B1 | * | 9/2003 | Ramberg et al. | 375/148 |
| 6,795,487 B1 | * | 9/2004 | Bickerstaff et al. | 375/147 |
| 6,912,242 B1 | * | 6/2005 | Farine et al. | 375/147 |
| 2002/0015439 A1 | * | 2/2002 | Kohli et al. | 375/148 |
| 2002/0186794 A1 | * | 12/2002 | Oesch et al. | 375/340 |

FOREIGN PATENT DOCUMENTS

WO    WO 98/59257    12/1998

* cited by examiner

*Primary Examiner*—Emmanuel Bayard
*Assistant Examiner*—Lawrence B. Williams
(74) *Attorney, Agent, or Firm*—Sughrue Mion, PLLC

(57) ABSTRACT

The receiver includes: a correlation stage (7) formed of several correlation channels (7') for receiving intermediate signals (IF) in order to correlate them, in operating channel control loops, with the carrier frequency and specific code replicas of visible emitting satellites to be searched and tracked, each channel having a correlator (8) in which at least one integrator counter (28, 29, 30, 31) provides, at the end of each determined integration period of the correlated signals, a binary output word whose value allows detection of the presence or absence of the visible satellite to be searched and tracked; and a microprocessor for processing the data drawn, after correlation, from the radio-frequency signals. The microprocessor configures at least one unused channel placed in parallel with one of the operating channels for searching and/or tracking the same visible satellite, the unused channel being configured so that the integration period of its integrator counter is different from that of the integrator counter of the operating channel.

10 Claims, 4 Drawing Sheets

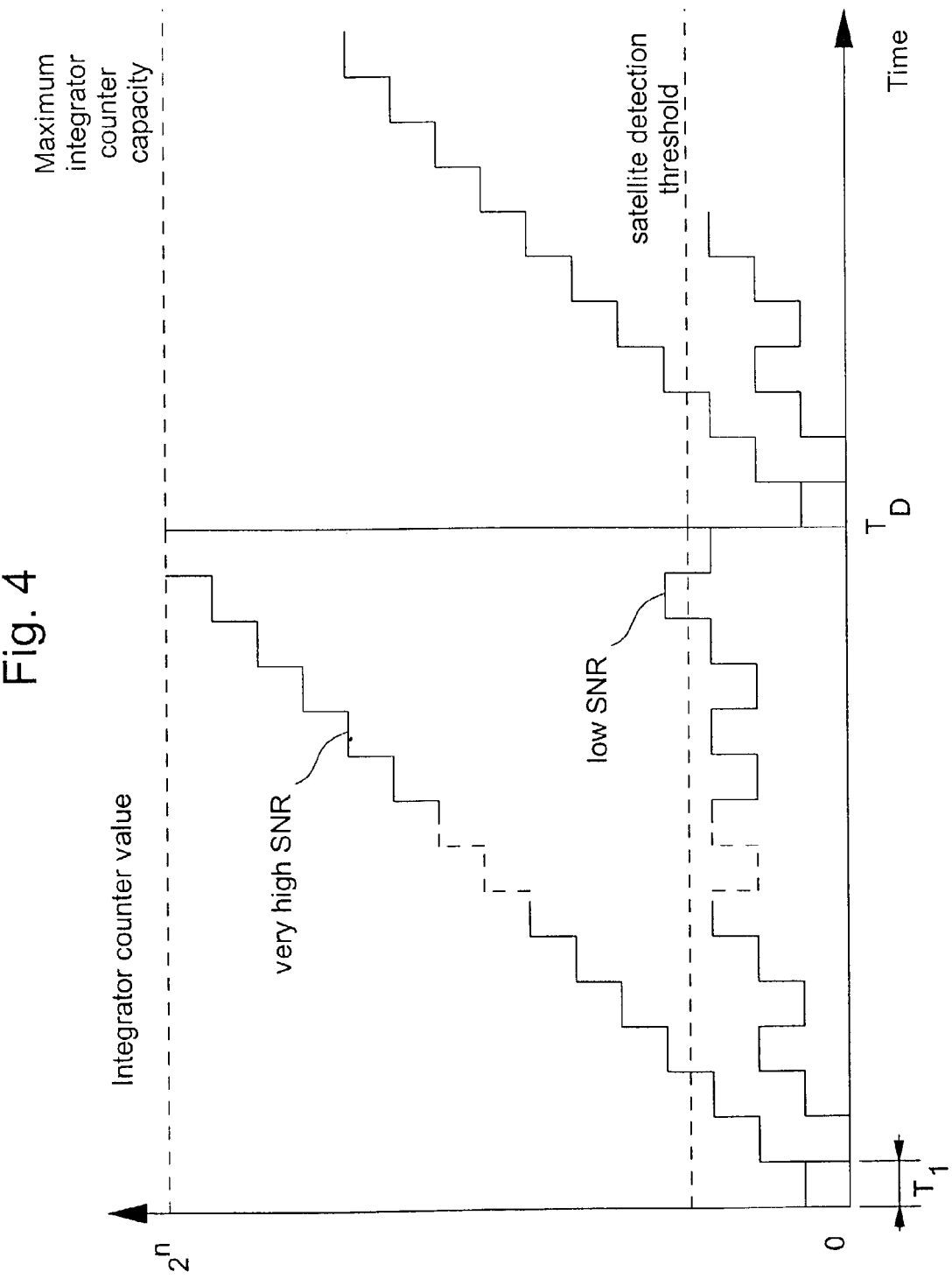

RADIOFREQUENCY SIGNAL RECEIVER WITH MEANS FOR IMPROVING THE RECEPTION DYNAMIC OF SAID SIGNALS

BACKGROUND OF THE INVENTION

The invention concerns a receiver for radio-frequency signals transmitted by transmitter sources, in particular of the GPS type. The receiver has means for improving the reception dynamic of said signals for example when the signals are masked by an obstacle. Said receiver includes receiving and shaping means with frequency conversion for the radio-frequency signals for generating intermediate signals, a correlation stage formed of several correlation channels for receiving the intermediate signals in order to correlate them, in operating channel control loops, with carrier frequency and specific code replicas of visible transmitting sources to be searched and tracked, each channel being provided with a correlator in which at least one integrator counter is capable of providing, at the end of each determined integration period of the correlated signals, a binary output word whose value compared to a determined detection threshold level allows to detect the presence or absence of the visible transmitting source to be searched and tracked, and microprocessor means connected to the correlation stage for processing the data extracted, after correlation, from the radio-frequency signals. In the case of a GPS receiver, the data extracted from the signals are in particular the GPS message and pseudo-ranges.

The radio-frequency signal receiver of the present invention can of course also be used in a satellite navigation system of the GLONASS or GALILEO type. Likewise, the receiver could be used in a mobile telephone network, for example of the CDMA type (Code-division multiple access). In such case, the transmitting sources are no longer satellites but base cells of the telephone network, and the processed data concerns audible or legible messages.

In the current GPS navigation system, 24 satellites are placed in orbit at a distance close to 20,200 km above the surface of the Earth on 6 orbital planes each offset by 55° with respect to the equator. The time taken by a satellite to make a complete rotation in orbit before returning to the same point above the Earth is approximately 12 hours. The distribution of the satellites in orbit allows a terrestrial GPS receiver to receive GPS signals from at least four visible satellites to determine its position, velocity and the local time for example.

In civil applications, each of the satellites in orbit transmits radio-frequency signals formed of a carrier frequency L1 at 1.57542 GHz on which are modulated a pseudo-random PRN code at 1.023 MHz peculiar to each satellite and a GPS message at 50 Hz. The GPS message contains the ephemerides and almanac data from the transmitting satellite, which are useful in particular for calculating the X, Y, Z position, velocity and time.

The PRN code (pseudo random noise), in particular of the Gold code type, is different for each satellite. This Gold code is a digital signal formed of 1023 chips which are repeated every millisecond. This repetition period is also defined by the term Gold code "epoch". It is to be noted that a chip takes the values 1 or 0 as for a bit. However, a chip in the GPS technology is to be differentiated from a bit which is used to define a unit of data.

The Gold codes defined for 32 satellite identification numbers have the characteristic of being orthogonal. By correlating them with each other the correlation result gives a value close to 0. This characteristic thus enables several radio frequency signals transmitted on a same frequency originating from several satellites simultaneously to be independently processed in several channels of the same GPS receiver.

Currently, in several daily activities, GPS receivers which are portable or incorporated particularly in vehicles are used to allow navigation data to be provided to users. This data facilitates orientation towards the desired target and allows users to have the knowledge of their bearings. Moreover, portable GPS receivers are of smaller size so as to enable them also to be incorporated in objects which can easily be transported by one person, such as in cellular telephones or in wristwatches. However, in these objects of small dimensions, it is often necessary to minimise the energy consumed by the receiver, as they are powered by a battery or accumulator of small size.

A GPS receiver needs to pick up the radio-frequency signals transmitted by at least four visible satellites in order to determine in particular its position and time related data. However, the receiver can pick up the almanac data peculiar to each satellite by locking on individually to one of the visible satellites.

SUMMARY OF THE INVENTION

As FIG. 1 shows symbolically, GPS receiver 1 includes an antenna 2 for picking up radio-frequency signals SV1 to SV4 transmitted by at least four visible satellites S1 to S4. However, certain of the radio-frequency signals can encounter various obstacles on their path, such as trees A for example, capable of disrupting the reception of the signals by said receiver. The result of this masking of signals SV1 and SV3, as shown in FIG. 1, is that the correlation channels set in operation in the receiver for searching and tracking satellites S1 and S3 can momentarily lose said signals SV1 and SV3. Thus, the receiver in satellite search and tracking phase cannot extract the information necessary to calculate its position, which is a drawback.

This phenomenon may also appear when the portable GPS receiver is in movement for example in a road vehicle. In this case, it is common for a multitude of trees lining a road to momentarily mask the radio-frequency signals from certain visible satellites picked up by said moving receiver. Following the loss of the masked signals, said receiver has to carry out a new search and track in order to lock onto at least four visible satellites. All the operations for determining position, velocity and time are thus slowed down.

So as to quickly recuperate lost signals due to an obstacle, such as a tree or a tunnel, European Patent document No. 0 429 783 discloses a method for tracking GPS type satellite signals for a GPS receiver placed in particular in a vehicle. As soon as the obstacle has gone, said receiver searches the satellite at the highest elevation which, as far as possible, prevents the signals being masked by a tree. The frequency of the satellite signals are divided into frequency bands wherein each frequency band is allocated to one of the correlation channels to accelerate acquisition of said satellite. Several correlation channels are thus used for the same satellite.

However, the channels having to lock onto the same satellite are configured in different ways in order to quickly search for the same satellite at the highest elevation, which is a drawback even if said satellite is quickly found. No means are provided to prevent the momentary loss of signals weakened by passage through an obstacle such as a tree, when the signals originate from visible satellites which do not have the highest elevation.

One object of the present invention is to provide a radio-frequency signal receiver, in particular of the GPS type, which prevents the momentary loss of signals picked up by at least one channel of the receiver, which are masked by an obstacle on their path while overcoming the drawbacks of the receivers of the prior art.

This object, in addition to others, is achieved by the aforecited receiver which is characterised in that the microprocessor means are arranged to configure at least one unused channel placed in parallel with one of the operating channels for searching and/or tracking the same visible transmitting source, the unused channel being configured such that the integration period of its integrator counter is different from the integration period of the integrator counter of the operating channel.

One advantage of the receiver is that it can adjust the detection sensitivity of the receiver by varying the time or the integration period of integrator counters of a channel defined as being unused. The unused channel is thus configured to search and track the same transmitting source, such as a satellite, as one of the operating channels.

The integrator counters of the unused channel will tend in normal obstacle-free operation to become saturated if their integration period is greater than a conventional integration period. In such case, only the data from the normally configured channel will be taken into account by the microprocessor means. Conversely, when the signals are weakened by passage through the obstacle or momentary interruption, the unused channel with its greater integration period can nonetheless manage to detect the presence of the satellite. The microprocessor detects the loss of signals of the operating channel configured in a standard manner to extract data from the unused channel.

Another advantage of the receiver is that it allows rapid position calculation even if the radio-frequency signals from a visible satellite are masked by an obstacle on their path thanks to the unused channel connected in parallel with a normally configured channel. The unused channel can be connected in parallel with one of the selected operating channels as soon as the latter no longer detects the specific satellite being tracked or from the beginning of the search for the selected channel.

In theory from the beginning of the acquisition phase, the microprocessor means can automatically select a first channel configured in a standard manner connected in parallel with another unused channel configured with a greater integration period. More than one unused channel can be connected in parallel with a selected channel in order to lock onto a same visible satellite.

The integration period of the unused channel is preferably double the integration period of the channel configured in a conventional manner. The unused channel or channels connected to the selected operating channel preferably remain switched on all the time in anticipation of a signal loss by the selected channel. However, in order to save energy, it may be desirable only to switch on the unused channel or channels periodically, or only on certain satellites.

The length of repetition of the specific pseudo-random code of the transmitting satellite is used as a basis for defining the integration period of a channel in a normal obstacle-free operating mode. The size of the integrator counters depends on the length of the pseudo-random code which defines the dynamic of the receiver.

The receiver has to include a larger number of channels than the maximum number of visible satellites. This enables a channel unused in normal operation to be configured differently in anticipation of any masking of the signals picked up by one of the channels.

Another advantage of connecting an unused channel with one of the operating channels to prevent the momentary loss of the signals is to assure continuity in the extracted data from the operating channels by the microprocessor means.

Another advantage of the receiver is that it can also provide each channel with a controller so as to relieve the microprocessor means of all synchronisation tasks for searching and tracking a satellite. This enables the transfer of multiple data from the operating channels to the microprocessor means to be reduced during all these satellite search and tracking phases.

BRIEF DESCRIPTION OF THE DRAWINGS

The objects, advantages and features of the radio-frequency signal receiver having means for improving the signal reception dynamic will appear more clearly in the following description of embodiments illustrated by the drawings, in which:

FIG. 4 shows a graph of the binary word values at the output of the integrator counters as a function of integration time.

DETAILED DESCRIPTION OF THE INVENTION

In the following description, several elements of the radio-frequency signal receiver, particularly of the GPS type, which are well known to those skilled in the art in this technical field, are mentioned only in a simplified manner. The receiver described hereinafter is preferably a GPS receiver. It could nonetheless be used in a GLONASS or GALILEO navigation system or any other navigation system, or in a mobile telephone network.

Figure 1:
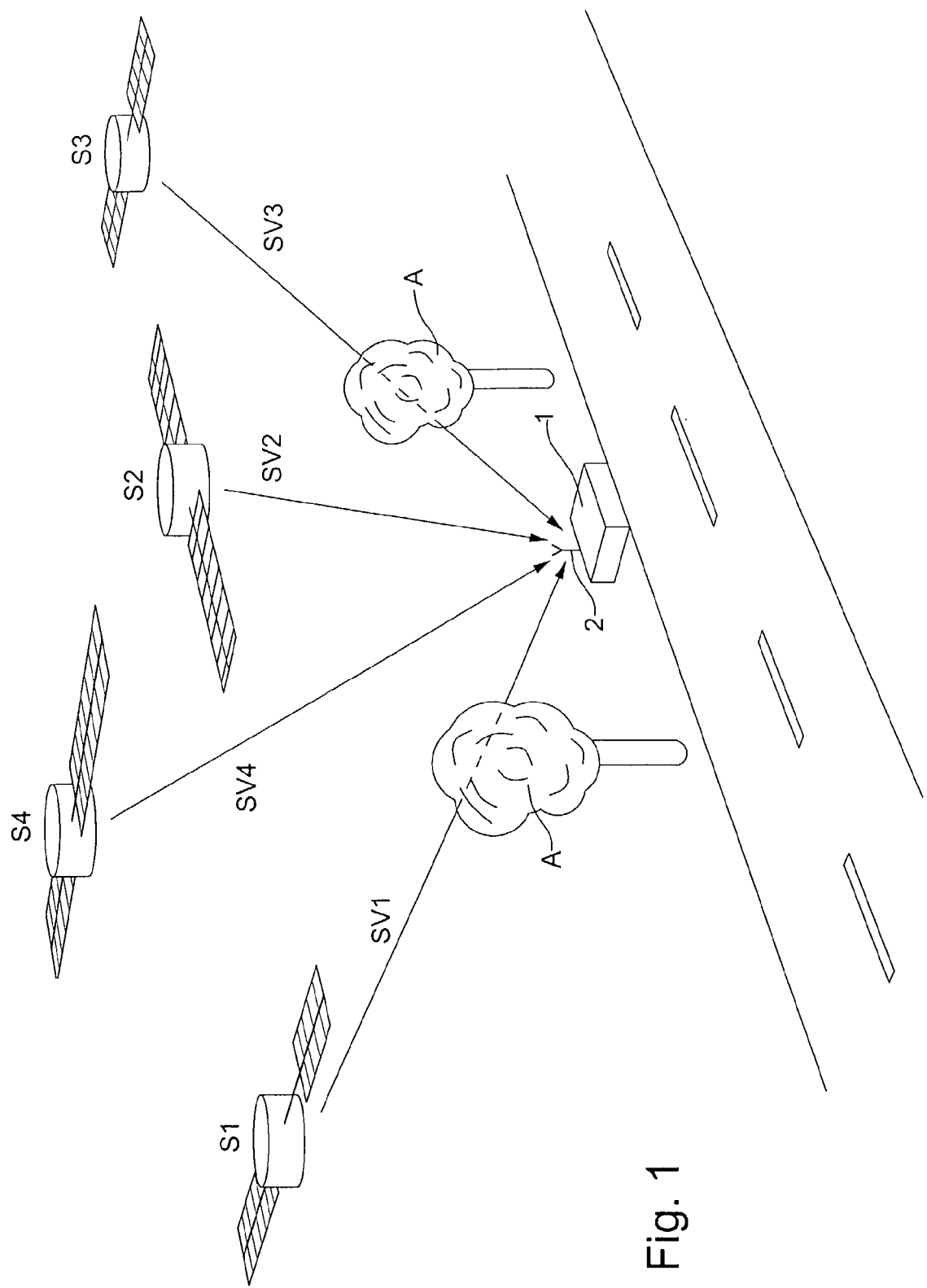
FIG. 1, which has already been cited, shows a GPS type radio-frequency signal receiver picking up signals from at least four satellites two of which are masked by obstacles.

As shown in FIG. 1, four visible satellites S1 to S4 transmit radio-frequency signals SV1 to SV4. Signals SV1 to SV4 of these four satellites are necessary for a GPS receiver 1 to be able to extract all the information useful for the calculation of its position, velocity and/or time. However, on the path of said radio-frequency signals various obstacles, such as trees A, may disrupt detection of said signals by correlation channels of receiver 1. The radio-frequency signals SV1 and SV3 shown have to pass through an obstacle to be picked up by antenna 2 of receiver 1. The correlation channels in the search and tracking phase of satellites S1 and S3 can thus momentarily lose signals SV1 and SV3. Means for improving the reception dynamic, described in the following description, are thus provided in the GPS receiver in order to prevent this loss of signals masked by such obstacles.

The GPS receiver can preferably be fitted to a portable object, such as a wristwatch in order to provide position, velocity and local time data as required to the person wearing the watch. As the watch has an accumulator or battery of small size, the power consumed must be as little as possible during operation of the GPS receiver.

Of course, the GPS receiver could be fitted to other portable objects of small size and low power consumption, such as portable telephones, which are also fitted with an accumulator or battery.

Figure 2:
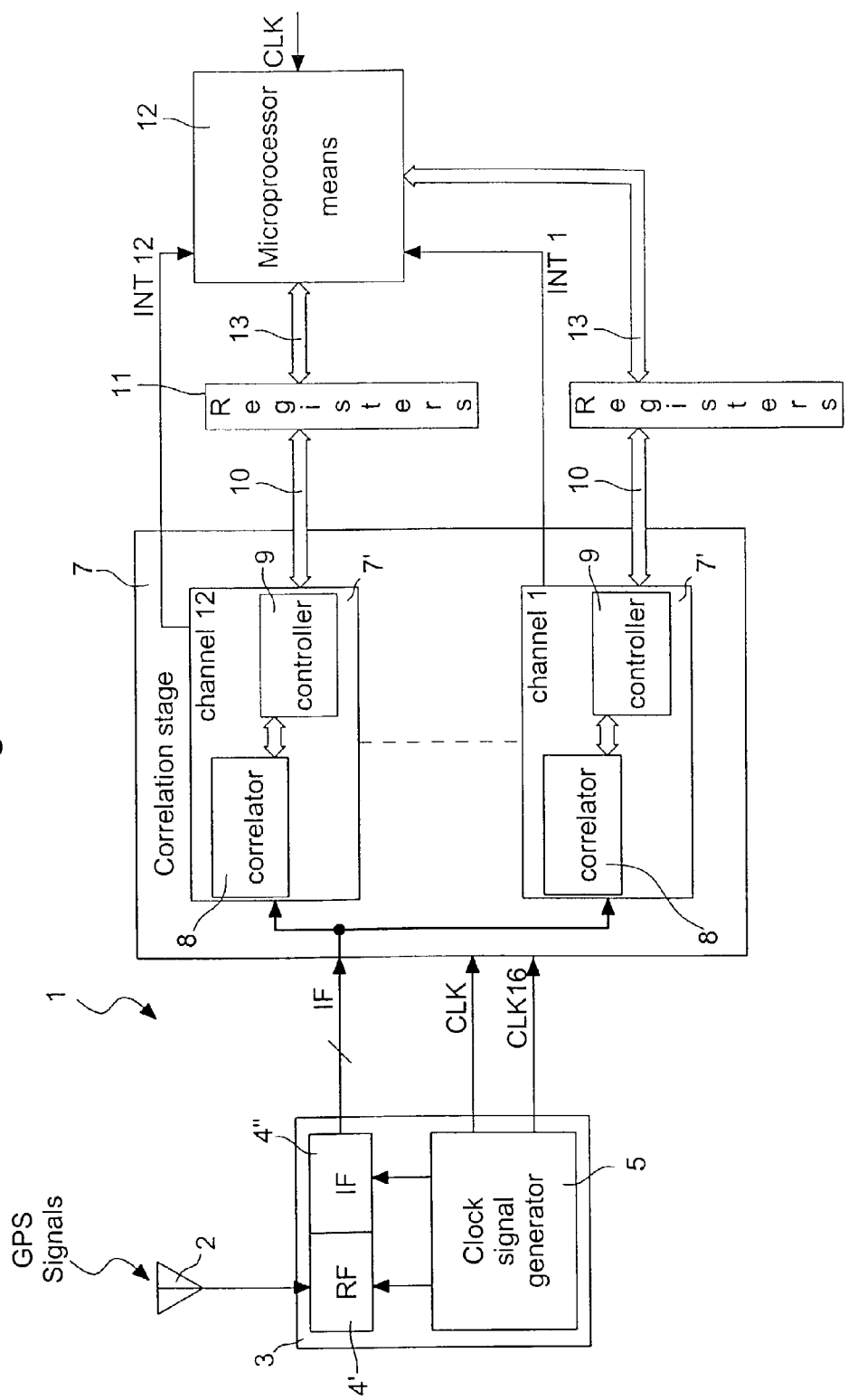
FIG. 2 shows schematically the various parts of the radio-frequency signal receiver according to the invention.

GPS receiver 1 is shown schematically in FIG. 2. It includes receiving and shaping means with frequency conversion of radio-frequency signals 3 provided by an antenna 2 to generate intermediate signals IF, a correlation stage 7 formed of 12 channels 7' for receiving intermediate signals IF, a data transfer bus 10 connecting each channel to a respective buffer register 11, and finally a data bus 13 connecting each buffer register to microprocessor means 12.

Intermediate signals IF are preferably, in a complex form, formed of a component of in-phase signals I and a component of quarter-phase signals (quadrature-phase) Q at a frequency of the order of 400 kHz provided by shaping means 3. The complex intermediate signals IF are represented in FIG. 2 by a bold line intersected by an oblique line defining 2 bits.

The number of channels 7' available in receiver 1 must be higher than the maximum number of visible satellites at any point on the Earth so that a certain number of unused channels remains. These unused channels are used to be connected in parallel with operating channels to prevent the momentary loss of signals by these channels as explained hereinafter in particular with reference to FIGS. 3 and 4.

Conventionally, in receiving means 3, a first electronic circuit 4' converts first of all the radio-frequency signals of frequency 1.57542 GHz into a frequency for example of 179 MHz. A second electronic circuit IF 4" then performs a double conversion to bring the GPS signals first of all to a frequency of 4.76 MHz then finally to a frequency for example of 400 kHz by sampling at 4.36 MHz. Intermediate complex signals IF sampled and quantified at a frequency of the order of 400 kHz are thus provided to channels 7' of correlation stage 7.

For the frequency conversion operations, a clock signal generator 5 forms part of the receiving and shaping means for radio-frequency signals 3. This generator is for example provided with a quartz oscillator, which is not shown calibrated at a frequency of the order of 17.6 MHz. Two clock signals CLK and CLK16 are provided in particular to correlation stage 7 and to microprocessor means 12 to clock all the operations of these elements. The first clock frequency CLK may have a value of 4.36 MHz, while the second clock frequency may be fixed at 16 times less, i.e. at 272.5 kHz used for a large part of the correlation stage in order to save on energy consumption.

It is to be noted that one may envisage obtaining clock signal CLK16 using a divider placed in the correlation stage instead of being integrated with clock signal generator 5 in receiving means 3.

The signals supplied by the second circuit 4" in half of the cases give signals of different parity (+1 and −1). Account must thus be taken of this parity for the demodulation operations of the GPS signals in the receiver. In an alternative embodiment, the second circuit 4" can give signals (+3; +1; −1; −3) distributed over 2 output bits for the in-phase component as well as for the quarter-phase (quadrature-phase) component.

In the case of the GPS receiver of the present invention, intermediate signals IF with 1-bit of quantification for the carrier frequency are provided to the correlation stage, even if this quantification generates an additional loss of the order of 3 dB on the signal noise ratio (SNR).

Registers 11 of each channel are capable of receiving configuration data or parameters originating from the microprocessor means. Each channel is capable of transmitting, via the registers, data concerning the GPS messages, the state of the PRN code, the frequency increment relating to the Doppler effect, the pseudo-ranges and other data after correlation and locking onto a specific satellite.

Buffer registers 11 are formed of several sorts of registers which are for example command and status registers, registers for NCO (Numerically Controlled Oscillator) oscillators of the channels, pseudo-range registers, energy registers, offset registers and increment registers of the carrier and of the code and test registers. It is to be noted that these registers can accumulate data during the correlation phase in order to be used during the acquisition and tracking of satellites without necessarily being automatically transferred to the microprocessor.

In an alternative embodiment, a single block of registers 11 can be envisaged for all the channels 7' of the correlation stage, given that certain data placed in the register unit is common to each channel.

Each channel 7' of correlation stage 7 includes a correlator 8 and a controller 9 intended to set into operation via a dedicated material, in particular the signal processing algorithm for acquiring the satellite signal and tracking the satellite detected by the channel.

Controller 9 of each channel includes, amongst other things, a memory unit, an arithmetical unit, a data bit synchronisation unit, a correlator control unit and an interruption unit, which are not visible in FIG. 1. The memory unit is formed in particular of a RAM memory for storing momentary data. The RAM memory is distributed in a non-regular or regular structure. The arithmetical unit performs in particular addition, subtraction, multiplication, accumulation and shift operations.

All the acquisition and tracking operations for the detected satellites are thus achieved autonomously in each respective channel of the correlation stage in a bit-parallel architecture where the calculation of several bits is achieved in a clock pulse. The digital signals are at 1 kHz, which allows autonomous processing of said signals of the carrier frequency and PRN code control loops at a less significant frequency rate. When a channel has locked onto a satellite, the circuit synchronises the flow of GPS data intended for subsequent calculations.

Thus, the transfer of data with microprocessor means 12 no longer occurs during all the correlation steps. It is only the result of the correlation of each channel 7' of correlation stage 7 which is transferred to the microprocessor, in particular the GPS messages at a frequency of 50 Hz. This results in a great reduction in current consumption.

Consequently, microprocessor means 12 preferably include an 8-bit CoolRISC-816 microprocessor by EM Microelectronic-Marin, Switzerland. This microprocessor is clocked by a clock signal at 4.36 MHz. Microprocessor means 12 also include memory means which are not shown, in which all the information concerning the position of said satellites, their Gold code, and those which are capable of being picked up by the terrestrial GPS receiver are stored.

During all of the satellite search and tracking procedures, the operating channels 7' transmit interruption signals INT1 to INT 12 to the microprocessor to alert it to data that it can extract. As soon as it receives interruption signals, the microprocessor generally has to run through all the channels to find out from which channel the data to be extracted originates. This data can concern for example configuration parameters, GPS messages, the state of the PRN code, the frequency increment due to the Doppler effect, pseudodistances, modes for interrupting the receiving means, the state of integrator counters and other information.

Since several interruption signals INT 1 to INT 12 can occur at the same time, microprocessor means 12 can also include a priority decoder for operating channels 7'. Thus, the microprocessor can directly access a priority channel transmitting an interruption signal in accordance with a determined order of priority.

In another embodiment, which is not shown, the priority decoder could also be integrated in the correlation stage.

A single semiconductor substrate can contain both the whole of the correlation stage with the registers, priority decoder, microprocessor and also possibly a part of the clock signal generator.

When receiver 1 is set in operation, several channels 7' of correlation stage 7 are configured by microprocessor means 12. The configuration of each channel consists in introducing therein different parameters relative to the carrier frequency and the PRN code of a specific satellite to be searched and tracked. In a normal operating mode, each channel is configured differently for searching and tracking its own satellite. Since the operating channels can only lock onto visible satellites, several unused channels remain.

It is known that certain of the visible satellites are located lower on the horizon than others. Consequently, the probability that an obstacle momentarily weakens the radio-frequency signals from these satellites is greater than that for the satellites located towards the zenith. In such case, it is sensible to place in parallel to selected channels, locked onto such satellites, unused channels which are configured so as to overcome the momentary loss of signals by the selected channels.

The unused channel or channels placed in parallel to the selected channels allow a greater satellite detection window to be obtained and thus a greater reception dynamic for the satellite signals as explained with reference to FIGS. 3 and 4. If the signals from said satellites are no longer masked by obstacles, these unused channels tend to become saturated and are thus unable to be used. Conversely, as soon as the signals are weakened, the microprocessor means can use the data provided by the unused channel(s) operating instead of the selected channel(s), which have lost the tracked satellite(s).

Figure 3:
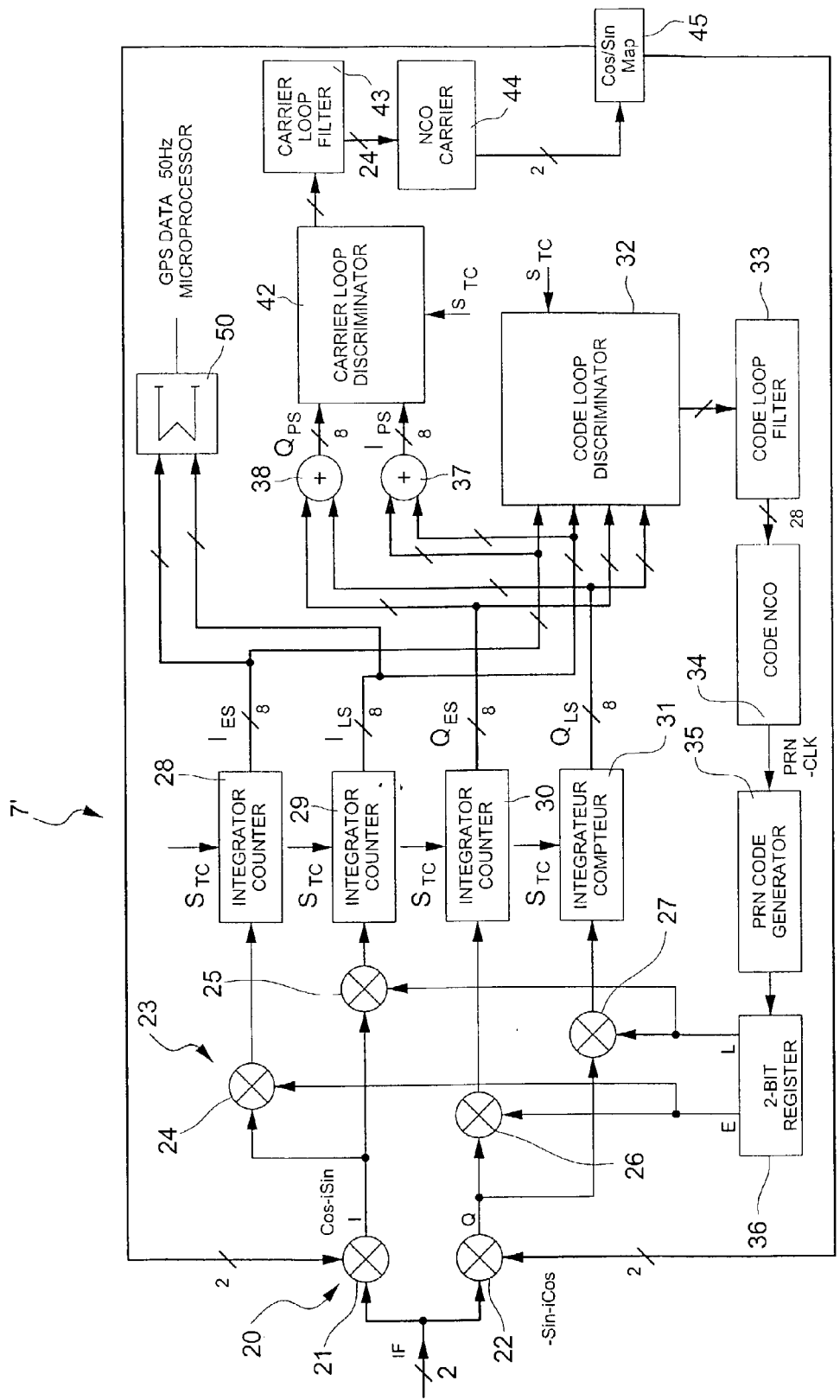
FIG. 3 shows schematically the elements of a correlator of one channel of the correlation stage of the receiver according to the invention.

FIG. 3 shows correlator 8 with a part for the PRN code control loop and another part for the carrier frequency control loop. Correlator 8 is identical in each channel 7' of correlation stage 7, but can be configured differently in each channel. For more details relating to the various elements of this correlator, the reader may refer to the teaching drawn from the book "Understanding GPS Principles and Applications" at chapter 5 by Phillip Ward and edited by Elliott D. Kaplan (Artech House Publishers, USA 1996) edition number ISBN 0-89006-793-7, and in particular in FIGS. 5.8 and 5.13.

With reference to FIG. 3, intermediate signals IF, represented in the Figure. by a bold line intersected by an oblique line defining 2 bits, are complex signals (I+iQ) formed of a 1-bit in-phase signal component and a 1-bit quarter-phase (quadrature-phase) signal component Q. Said intermediate signals IF have been sampled and quantified, and are passed first of all through first mixers 20 of the carrier. A mixer or multiplier 21 multiplies signals IF by the cosine minus i times the sine of the internally generated carrier replica in order to extract the in-phase signal I from the complex signals, whereas a mixer or multiplier 22 multiplies the signals IF by the minus sine minus i times the cosine of the internally generated carrier replica in order to extract the quarter-phase signal (guadrature-phase) Q from the complex signals.

These Sin and Cos signals originate from a block 45 of a COS/SIN table of the replica signal. The purpose of this first step in first mixers 20 is to extract the carrier frequency from the signals bearing the GPS message.

After this operation, the equivalence of the PRN code of the signals from a satellite to be acquired has to be found, in an operating or switched-on channel with a PRN code generated in said channel corresponding to the desired satellite. In order to do this, the in-phase and quarter-phase signals pass through second mixers 23 to correlate signals I and Q with an early replica and a late replica of the PRN code to obtain four correlated signals. In each channel of the correlation stage, only the early and late replica is kept without taking account of the punctual replica. This enables the number of correlation elements to be minimised. However, by removing the punctual component from the code control loop, a loss in signal noise ratio of the order of 2.5 dB is observed.

The mixer or multiplier 24 receives signal I and early replica signal E from a 2-bit register 36 and supplies a correlated early in-phase signal. Mixer or multiplier 25 receives signal I and late replica signal L from register 36 and supplies a correlated late in-phase signal. Mixer or multiplier 26 receives the quarter-phase signal Q and early signal E and supplies a correlated early quarter-phase signal. Finally, mixer or multiplier 27 receives signal Q and late replica signal L, and supplies a late quarter-phase signal. The drift or offset between early replica E and late replica L is a half chip in the embodiment of the present invention, which means that the drift with a central punctual component P is ¼ chip. The multipliers can be made for simplicity using XOR logic gates for example.

The four correlated signals each enter one of integrator counters 28, 29, 30, 31 which are pre-detection elements, whose binary output words $I_{ES}$, $I_{LS}$, $Q_{ES}$ and $Q_{LS}$ are represented over 10 bits. The number of bits of the binary word at the output of the integrator counters defines the reception dynamic of the receiver. It is defined to be able to count up to a number 1023, which is equal to the number of chips of the PRN code. Each integrator counter 28, 29, 30, 31 of a channel selected by the microprocessor means at the beginning of a search is configured to provide a complete set of binary words $I_{ES}$, $I_{LS}$, $Q_{ES}$ and $Q_{LS}$ every millisecond.

Conversely in the event that one chooses to connect an unused channel in parallel to a selected channel, the unused channel is configured so that the integration period of its integrator counters is greater than the standard integration period. The microprocessor means thus send signals $S_{TC}$ to each integrator counter to require it to count over a period greater than 1 ms. Preferably, the integration period of the unused channel is fixed at double the standard integration period, but of course it could be fixed at an integer multiple of time $T_D$ (FIG. 4).

The variation in the integration period of the integrator counters thus allows the receiver's sensitivity to be adjusted, i.e. the signal reception dynamic to be increased. Consequently, the weak radio-frequency signals received by the receiver will have more chance of being above a detection threshold of each integrator counter at the end of the integration period. The unused channels thus configured therefore have more chance of tracking a satellite whose signals were masked by an obstacle than the conventionally configured selected channels.

The detection threshold is chosen so as to detect the presence or absence of a satellite searched or tracked taking account of the fact that the radio-frequency signals are "noisy".

All the operations in the loops which follow these integrators occur in a bit-parallel architecture with signals at a frequency of 1 kHz. In order to remove a part of the noise of the useful signal to be demodulated, only the 8 most significant bits are used for the rest of the digital signal processing chain.

The binary output words $I_{ES}$, $I_{LS}$, $Q_{ES}$ and $Q_{LS}$, represented in the Figure by a bold line intersected by an oblique line defining 8 bits, are passed into a code loop discriminator 32 and into a code loop filter 33. The code loop discriminator performs the operations of calculating the energy of signals $I_{ES}$, $I_{LS}$, $Q_{ES}$ and $Q_{LS}$. An accumulation of values during a certain number N of integration cycles, for example 16 cycles, is achieved in the code discriminator. Consequently, the microprocessor means also impose signals STC on discriminator 32 for the unused channels placed in parallel to the selected channels.

The discriminator is non-coherent and of the delay lock loop type (DLL). It is formed in particular by an 8-bit multiplier and by a 20-bit accumulator. On this discriminator, a correction is brought from the carrier loop, since during transmission of the signal by the satellite, the Doppler effect is felt not only on the carrier frequency, but also on the PRN code, which is modulated on the carrier frequency. Bringing the carrier into the code loop discriminator corresponds to dividing the carrier drift increment by 1540.

Depending on the filtered result of the discriminator, a phase increment is imposed by the 28-bit NCO oscillator on PRN code generator 35 so that it transmits the PRN code bit series to register 36 to make a new correlation. The frequency resolution of this 28-bit NCO is of the order of 16 mHz (for a clock frequency of 4.36 MHz).

The controller processes the various results of the loop so that it can co-ordinate the acquisition and tracking operations. Once there is synchronisation and locking onto the desired satellite, the values $I_{ES}$ and $I_{LS}$ are introduced into a demodulation element 50 capable of providing the data message at 50 Hz over 1 bit via the data input and output register to the microprocessor means. In addition to the message, the microprocessor means can take in particular the information concerning the pseudo-ranges introduced in the buffer register in order to calculate the X, Y and Z position, velocity and precise local time.

None of the elements explained hereinbefore will be described in detail, given that they form part of the general knowledge of those skilled in the art in this technical field.

The sum of signals $I_{ES}$ and $I_{LS}$ in adder 37 is used to create signal $I_{PS}$ and the sum of signals $Q_{ES}$ and $Q_{LS}$ in adder 38 is used to create signal $Q_{PS}$, both represented by 8 bits. These binary words are introduced at a frequency of 1 kHz into a carrier loop discriminator 42 (envelope detection) to calculate the energy of the signals followed by a carrier loop filter 43. The discriminator is formed in particular of an 8-bit multiplier and a 20-bit accumulator. It is of the frequency and phase lock loop type.

A mean operation is performed on the frequency discriminator in order to increase the robustness and precision of the carrier tracking loops. The accumulation provided in the discriminator lasts for a number N of cycles, for example 16 cycles, which corresponds to 16 ms. The microprocessor means also impose signals $S_{TC}$ on discriminator 42 for the unused channels placed in parallel to the selected channels.

Depending on the result of the discriminator and after passage through the filter, the 24-bit NCO oscillator of carrier 44 receives a frequency implement (bin) for correcting the carrier frequency replica. This 24-bit NCO has a frequency resolution of the order of 260 mHz.

The two control or enslaving methods of code and carrier are synchronised during tracking, although the carrier tracking loops are only updated after confirmation of the presence of the satellite signal.

It should be known that during transmission of the radio-frequency signals by a satellite, the Doppler effect has an influence on said signals both on the carrier frequency and on the PRN code, which means that the code and carrier control loops are connected to each other to obtain better adjustment precision of the PRN code phase and carrier frequency received at the receiver.

At each correlation epoch, the PRN code phase is delayed by steps of 1 chip. This allows the code to be offset in time in order to find the satellite phase drift. Once the satellite has been found, the carrier frequency including the Doppler effect has to be corrected which occurs in a control loop of the carrier. In addition to the Doppler effect, account must also be taken of the lack of precision of the internal oscillator and the ionosphere effects. These errors, corrected in the code and carrier loops correspond to a frequency drift of ±7.5 kHz.

Since it is possible for there to be an interruption in the radio-frequency signals following an obstacle, an interruption check is performed on the operating selected channel. As soon as said channel no longer provides output binary words from its integrator counters above a determined satellite detection threshold level, the data from the unused channel placed in parallel is taken into account by the microprocessor means. Since the integration period is longer in the unused channel, it thus has more chance of detecting the signals from the visible satellite which are weakened by the obstacle.

By way of illustration, FIG. 4 shows a graph of the binary word values during integration of the integrator counters as a function of the integration time. In an ideal case, where there is full correlation particularly of the code replica with the intermediate signals, the output binary word value of an integrator counter reaches the maximum, i.e. $2^n$ or 1023 with a PRN code replica at the end of the integration period $T_D$. At the end of this integration period, the counter is reset to zero to perform a new integration counting step.

For the present invention, the channels selected for searching and tracking visible satellites have an integration period fixed at 1 ms. Conversely, the unused channels connected in parallel to the selected channels are configured with a greater integration period, preferably of the order of 2 ms. However, most of the time, the binary word value at the end of period $T_D$ during tracking of a visible satellite is between the maximum capacity value and a determined threshold level. At each clock pulse $T_1$ or CLK, the integrator counter increments or decrements the binary word as a function of the correlated signals that it receives.

If an obstacle appears on the path of the signals of a visible satellite picked up by a selected channel of the receiver, it may happen that the integrator counters of this channel provide, at the end of each integration period $T_D$, binary words whose value is below the threshold level. By increasing the integration period of the integrator counters, the channel has more chance of avoiding losing the signals masked by the obstacle.

As defined above, all the information concerning the position of said satellites, their Gold code, and those that are capable of being perceived by the terrestrial GPS receiver are stored in a memory of the microprocessor means. Usually, at the beginning, all the channels of the receiver are configured in a conventional manner in order each to search and track a specific satellite. However, after this first phase, only a certain number of channels set into operation have locked onto a visible satellite. Consequently, after this step several deactivated or unused channels remain.

Subsequently, the microprocessor means can reactivate the unused channels in order to prevent the selected channel signal loss in the visible satellite tracking phase. In order to do this, these unused channels, as defined hereinbefore, are each placed in parallel with one of the respective operating channels. The unused channels are configured with a greater integration period than the operating channels so as to increase the signal reception dynamic. In theory, the unused channels are connected in parallel only with channels locked onto visible satellites capable of having signals masked by an obstacle.

One may also envisage, in another method for connecting the unused channels, that as soon as the receiver is switched on, it configures in a conventional manner only the channels able to lock onto a specific visible satellite. Following which, at least one unused channel is connected in parallel to one of the operating channels to prevent the momentary loss of signals masked by an obstacle.

If the GPS receiver is fitted to a low power consuming portable object provided with a battery or an accumulator, it is not generally necessary to switch on all the channels. At least four channels each locked onto a specific visible satellite are sufficient to provide the data to the microprocessor means for calculating position, velocity ed and/or time. These four channels are configured in a conventional manner. Thus, according to the present invention, it may be desirable to configure other unused channels, each placed in parallel with a respective selected channel, with a greater integration period.

Several channels may also be configured differently in parallel to search and/or track the same satellite capable of having its radio-frequency signals masked by an obstacle on their path. Each channel may be configured by the microprocessor means to have a different integration time from their integrator counters. Likewise, it may be conceivable to increase the integration period of the integrator counters of an operating channel if the microprocessor means observe that said channel is no longer detecting the radio-frequency signals from the visible satellite being tracked.

From the description which has just been given, multiple variant embodiments of the receiver, in particular of the GPS type, can be conceived without departing from the scope of the invention defined by the claims.

What is claimed is:

1. A receiver for radio-frequency signals transmitted by transmitting sources, in particular of the GPS type, said receiver including:
    receiving and shaping means with frequency conversion for the radio-frequency signals for generating intermediate signals,
    a correlation stage formed of several correlation channels for receiving the intermediate signals in order to correlate them, in control loops of operating channels, with carrier frequency replicas and specific code replicas of visible transmitting sources to be searched and tracked, each channel being provided with a correlator in which at least one integrator counter is capable of providing, at the end of each determined integration period of the correlated signals, a binary output word whose value, compared to a determined detection threshold level, allows detection of the presence or absence of the transmitting source to be searched and tracked, and
    microprocessor means connected to the correlation stage for processing data extracted, after correlation, from the radio-frequency signals, wherein the microprocessor means is arranged to configure at least one unused channel placed in parallel with one of the operating channels for searching and/or tracking a same visible transmitting source, the unused channel being configured so that the integration period of its integrator counter is different from the integration period of the integrator counter of the operating channel.

2. A receiver according to claim 1, for receiving radio-frequency signals transmitted by satellites, wherein the correlation stage includes a greater number of correlation channels than a number of visible satellites so that at least one unused channel can be connected in parallel with an operating channel for searching and/or tracking a same specific visible satellite.

3. A receiver according to claim 2, wherein the number of channels is greater than or equal to 12.

4. A receiver according to claim 1, wherein several unused channels are configured to be connected each in parallel with one of the operating channels, the integration period of the integrator counter of each unused channel being greater than the integration period of the integrator counter of the respective operating channel.

5. A receiver according to claim 1 for receiving radio-frequency signals transmitted by satellites, wherein the integration period of the integrator counter of a channel operating in visible satellite searching and/or tracking phase is equivalent to a repetition period a the specific code of a transmitting satellite, and wherein the integration period of the integrator counter of an unused channel configured to be connected in parallel to the operating channel is greater than the repetition period of the specific code and preferably equal to double said repetition period.

6. A receiver according to claim 1, wherein a set of data input and output registers is placed as an interface between the correlation stage and the microprocessor means in order to receive data transmitted by the microprocessor means to the correlation stage and data provided by the correlation stage for the microprocessor means.

7. A receiver according to claim 6, wherein a set of registers is provided for each channel of the correlation stage.

8. A receiver according to claim 1 for receiving radio-frequency signals transmitted by satellites, wherein, in each channel, a controller, including a digital signal processing algorithm, is associated with the correlator to allow all synchronisation tasks for searching and tracking a satellite to be performed autonomously independently of the microprocessor means, when the channel is set into operation.

9. A receiver according to claim 1 for receiving radio-frequency signals transmitted by satellites, wherein each channel receives complex intermediate signals formed of an in-phase signal component and a quadrature phase signal component, in that each correlator of the channels includes:
    first mixers for correlating the in-phase signal component with a first carrier frequency replica and for correlating the quadrature-phase signal component with a second carrier frequency replica offset by 90° with respect to the first carrier frequency replica; and
    second mixers for correlating the output in-phase signal of the first mixers with a first early specific code replica and with a second late specific code replica and for correlating the quadrature-phase output signal of the first mixers with the first early replica and the second late replica, and in that four integrator counters per channel receive the correlated output signals from the second mixers in order to each provide a binary output word whose value, compared to the determined detection threshold level, allows detection of the presence or absence of a satellite to be searched and tracked.

10. A receiver according to claim 1, wherein after the integrator counters, each channel correlator includes a carrier discriminator in a carrier correction control loop and a code discriminator in a code correction control loop, each discriminator being configured by the microprocessor means to take account of output values of the integrator counters over a discriminator period N times greater than the integration period, N being an integer number, the discriminator period of an unused channel connected in parallel to an operating channel being greater than the discriminator period of the operating channel, preferably equal to double said discriminator period.

* * * * *